Figure 7:
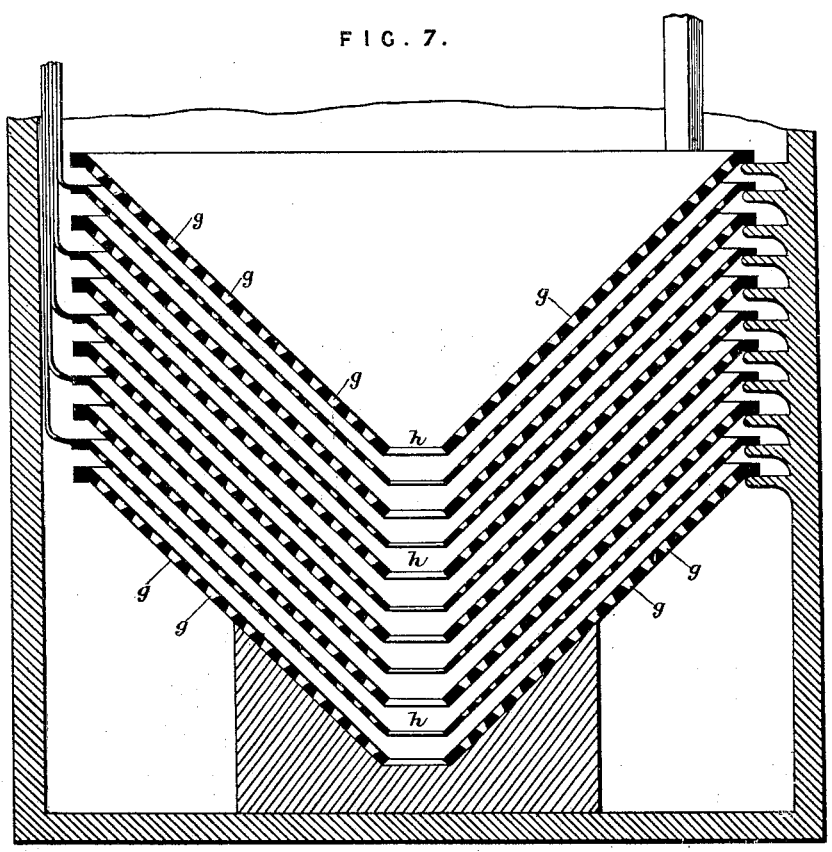

(No Model.) 4 Sheets—Sheet 1.

J. S. SELLON.
SECONDARY BATTERY OR ELECTRICAL ACCUMULATOR.

No. 325,120. Patented Aug. 25, 1885.

(No Model.) 4 Sheets—Sheet 2.

J. S. SELLON.
SECONDARY BATTERY OR ELECTRICAL ACCUMULATOR.

No. 325,120. Patented Aug. 25, 1885.

(No Model.) 4 Sheets—Sheet 3.
J. S. SELLON.
SECONDARY BATTERY OR ELECTRICAL ACCUMULATOR.
No. 325,120. Patented Aug. 25, 1885.
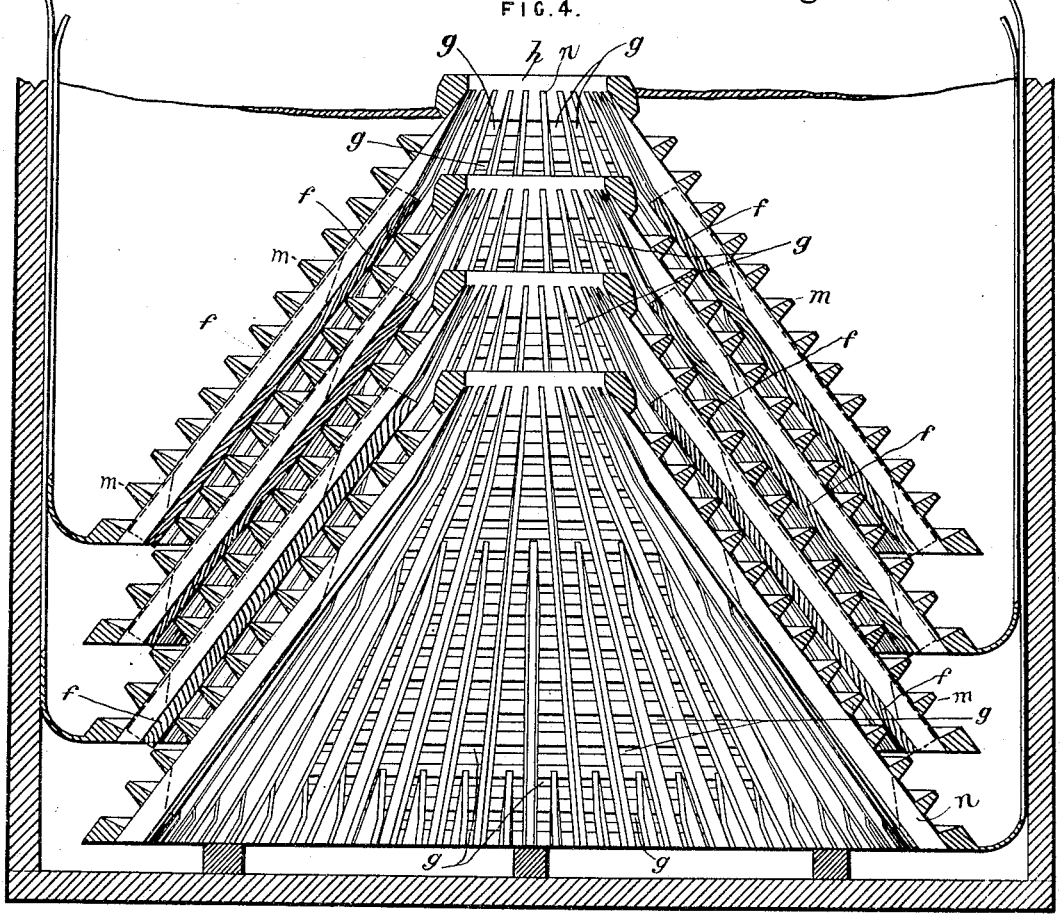
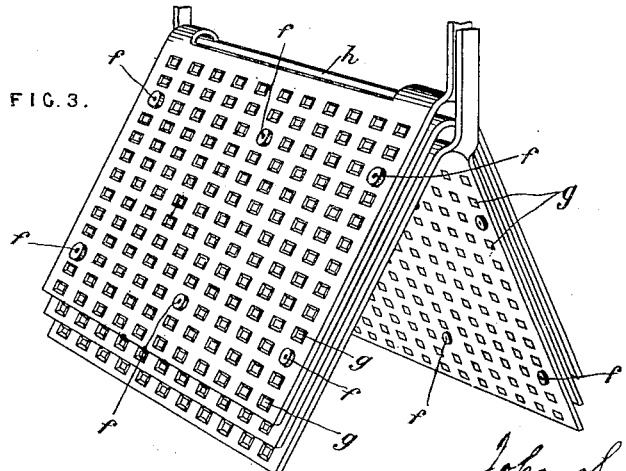

(No Model.)  4 Sheets—Sheet 4.
J. S. SELLON.
SECONDARY BATTERY OR ELECTRICAL ACCUMULATOR.
No. 325,120. Patented Aug. 25, 1885.
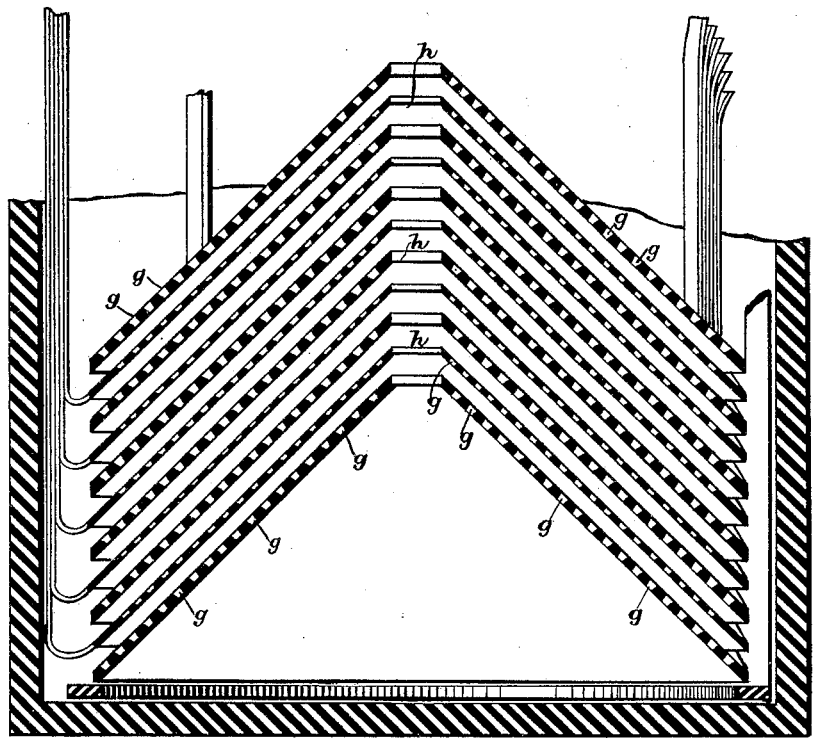
FIG. 6.
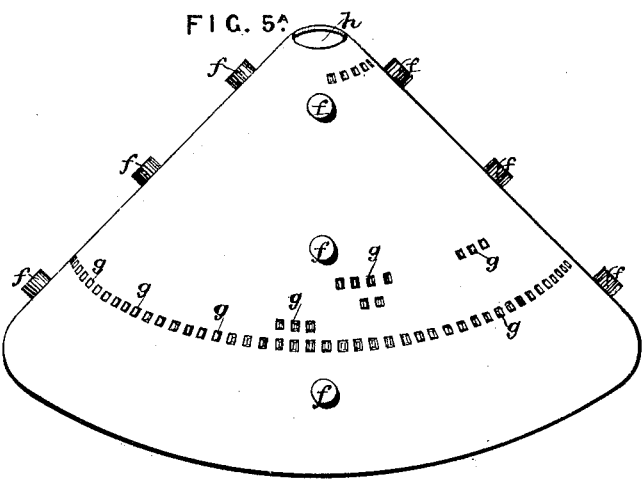
FIG. 5ᵃ

UNITED STATES PATENT OFFICE.

JOHN SCUDAMORE SELLON, OF HATTON GARDEN, COUNTY OF MIDDLESEX, ENGLAND.

SECONDARY BATTERY OR ELECTRICAL ACCUMULATOR.

SPECIFICATION forming part of Letters Patent No. 325,120, dated August 25, 1885.

Application filed February 5, 1885. (No model.) Patented in England April 10, 1884, No. 6,228, and in France January 14, 1885.

*To all whom it may concern:*

Be it known that I, JOHN SCUDAMORE SELLON, gentleman, a subject of the Queen of Great Britain and Ireland, and residing at Hatton Garden, in the county of Middlesex, England, have invented certain Improvements in Secondary Batteries or Electrical Accumulators, (for which I have made applications for patents in Great Britain, No. 6,228, dated April 10, 1884; France, dated January 14, 1885, and Germany, dated 1885,) of which the following is a specification.

My invention has for one of its objects the prevention of the leakage which may occur in some forms of plates of secondary batteries, (whether such plates be plain, corrugated, ribbed, fluted, grooved, or roughened, or rendered spongy or cellular on the surface by any mechanical, metallurgical, or chemical process)—as, for instance, in the forms wherein what are known as "cone" or "pyramid" shaped plates are used, especially if such plates be made of comparatively thin sheet-lead or of cast-lead, and be used as compound plates or double electrodes—*i. e.*, negative on one side and positive on the other, they being available, also, as vessels for containing the electrolyte.

A further object of my invention is so to arrange the plates of secondary batteries as to secure the advantages of self-clamping and economy of space, and also a convenient construction of the plates, whether flat or of conical, pyramidal, or other suitable form, or some or all of these advantages in combination.

In manufacturing or arranging, according to my invention, a battery or accumulator with compound plates of a cone, pyramidal, or analogous cup or basin-like or container-like form, to be used as a positive element on one side and as a negative element on the other side, and constituting containers of the electrolyte, which forms, by reason of the great economy of their construction and of the small space they occupy, (no cells or vessels to contain the electrolyte being required,) are especially suitable for employment as regulators, I interpose an insulating material between the members or individual plates of the compound plate, which I may conveniently effect by placing two plates together to form a pair of electrodes, insulating either partially or entirely the surfaces, or one of the surfaces, which are opposed to each other or placed together, or which fit into or against each other. To effect the insulation I may use Prout's glue or pitch, with or without grease, or other suitable insulating compound or material, with which I coat or cover, or partially coat or cover, one or both of the opposed surfaces of the plates before bringing them together; or I may effect the insulation by leaving a sufficient space between the component plates of each compound plate, or by interposing between the opposed surfaces a sheet or layer, or sheets or layers, of an insulating material—such, for example, as india-rubber or gutta-percha—with or without its edge projecting beyond the plates to arrest capillary attraction of moisture from cell to cell when the said plates are packed in columns; and, in addition, I may make a splayed edge, or employ any of the forms of edge or arrangements specified in my English Patent No. 5,069 of 1883, or their equivalent, to one or both of the plates, which together are to form the compound plate or pair of electrodes, or any arrangement of projections, ribs, or studs, or raised portions, to allow space for a greater or less quantity of the insulating material to rest at parts between the surfaces or at the rims, or to make contacts between the plates when desired.

By the above means I prevent the leakage which is liable to occur with the hereinbefore-mentioned forms of batteries as hitherto constructed or arranged.

A further object of my invention is to manufacture the plates used as single electrodes (whether they be flat plates, or cones, or pyramids, or of annular or other suitable shape, and whether they be plain or perforated, roughened or rendered spongy or cellular by any mechanical, metallurgical, or chemical process, or corrugated, fluted, grooved, ribbed, latticed, indented, or the like, or be made with shelves or projections, or any combination of such equivalent form, and whether they have or have not material to be rendered active packed upon, in, or attached to them) so that the said plates can be arranged one above the other in columns, piles, or stacks in cells for containing the electrolyte, the said plates having openings to allow of the free escape of the gases, and being separated by any suitable media—such as strips, plugs, buttons, or pieces of wood, insulate earthenware, or any other suitable material, and of any form or in any manner—which will insure the purpose of keeping the plates equidistantly apart in the containing cell or vessel, and allow sufficient diffusion of the electrolyte and the proper passage of the gases.

By such forms of plates, and by the arrangement of stacking the said plates so that they are supported the one in or over the other, self-clamping is or may be effected by the mere weight of the plates themselves, thus reducing the risk of buckling or contortion, and, as they may be built up to any height, great economy of space is attained, together with any desired capacity. A further advantage is also secured by the connections being, with the exception of their terminals, immersed in the electrolyte. In cells of large size, in order to equalize the unequal resistance of the different lengths of the connections when attached separately to each plate, as shown, and as may be done for convenience of the ready removal of the plates, instead of connecting the alternate plates together, the connections may be varied in thickness according to their length. The containers of the said plates may be of any suitable material and construction, and the electrolyte may be of any suitable strength or composition.

In manufacturing the plates I make them of gridiron form, or perforated, grooved, roughened, or rendered spongy or cellular by any mechanical, metallurgical, or chemical process, or corrugated, indented, ribbed, shelved, latticed, or other suitable form or compound form, preferably when I employ an active material in combination therewith, making the perforations, slits, openings, interstices, or projections of a beveled, slanting, conical, or other suitable or equivalent shape, with the smaller portion downward, so that the active material cannot fall through or out of the said perforations, slits, openings, or interstices, or readily break off or away from its position.

The accompanying drawings illustrate ways in which my invention can be advantageously carried into effect.

Figure 1:
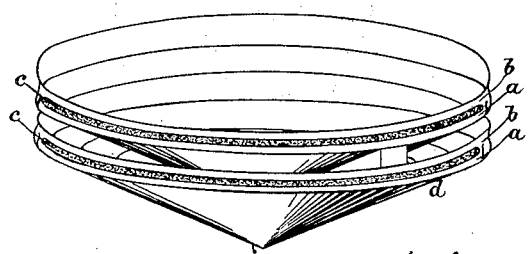
Figure 2:
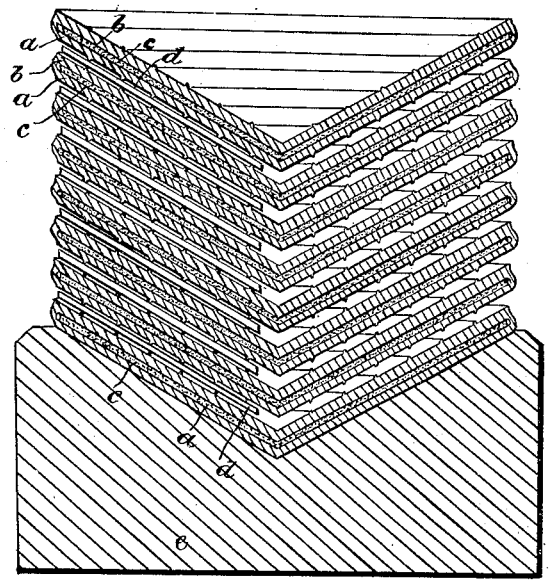

Figure 1 represents two compound conical plates, which may be either plain, as shown in said figure, or with ribs, as in Fig. 2, or of other known or suitable form, and with or without active material, or material to become active, packed upon or attached to or against them. Each pair of plates forms negative and positive electrodes $a$ and $b$, metallically or conductively connected together, each of the compound elements of the pairs of plates having intervening between them a layer or layers, or piece or pieces, of insulating material or spaces, $c$, and each pair being separated from the adjacent pair or pairs by strips, studs, rings, supports, or the like, $d$, of an insulating material. Fig. 2 shows a pile of these pairs of plates placed together on a support, $e$.

Fig. 3 shows triangular or saddle-shaped flat plates, constituting alternately positive and negative elements separated by insulating studs or separators $f$, and provided with openings or interstices $g$, which can, when any active material is used, advantageously be of a taper shape (the smaller part downward) for the reception and retention of the active material. Each plate has an opening or openings—for example, as at $h$—for the passage of gas. The plates in this figure are shown placed straddlewise, or one over the other; but it will be evident that they can be placed the reverse way up, so that they rest one inside the other, or in any other convenient position. In either case they are placed in a suitable cell or vessel containing the electrolyte, and they may rest entirely or in part upon projections or rests provided for them on or in the said cell or vessel.

Figure 5:
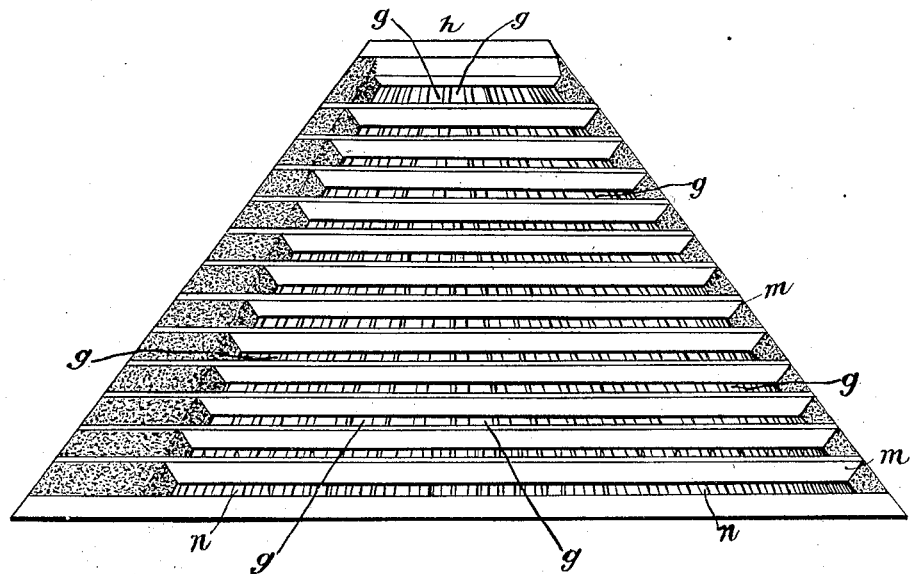

Fig. 4 shows an arrangement of plates of a conical formation placed one upon the other. These plates are provided with a series of horizontal shelves or ribs, $m$, and with a series of vertical strips or ribs, $n$, the two sets of ribs $m\ n$ forming between them openings $g$, which are preferably, as shown, formed with the smaller part downward. As shown in Fig. 4, the plates are separated by insulating strips or separators, and each plate has an aperture, $h$, at the apex for the escape of the gases. As shown, alternate plates are connected to form, respectively, the positive and negative plates of the series. In Fig. 5 a single plate of this kind is separately shown.

In Fig. $5^A$ a single plate of conical form is shown, the said plate being provided with tapering perforations $g$, similar to those shown in Fig. 3, and with an opening, $h$, at the apex. The separators $f$, of insulating material, are shown in the form of studs.

Fig. 6 shows a series of such plates assembled together in a suitable battery, tank, or vessel, and alternately connected to form the positive and negative elements of the battery.

In Fig. 7 a series of similar plates are shown, the plates being arranged with the base of the cone uppermost, instead of the reverse way, as in Figs. 4 and 6. The plates are represented as being supported upon projections or rests provided for them in or on the battery-vessel; but it is obvious that the plates shown in other figures, instead of resting one directly upon the other, may be supported partly or entirely as shown in Fig. 7.

I do not limit myself to the exact arrangements of the parts, or to the shapes of the plates, or of the perforations, projections, &c., as shown in the drawings, as it will be understood that they may be considerably varied without departing from the nature of my invention, provided they retain the essential features, as hereinafter claimed.

I claim—

1. In a secondary battery or electrical accumulator, a series of conical or equivalent shaped plates forming compound elements, the component parts of each element having between them insulating material or spaces, the said compound elements being separated from each other, as described, and forming containers of the electrolyte, substantially as set forth.

2. In a secondary battery, the series of conical or equivalent shaped plates placed in or upon each other in a suitable battery, tank, or vessel, as specified, and provided with openings or passages through the plates for the escape of gases, substantially as described.

3. A secondary battery or electrical accumulator comprising series of conical or equivalent shaped electrodes placed in or upon one another in a suitable battery, tank, or vessel, so as to be self-clamping, the said plates being separated from each other by insulating strips or pieces, and being provided with passages or openings through the plates for the escape of the gases and the diffusion of the electrolyte, substantially as described.

In testimony whereof I have signed my name to this specification in the presence of two subscribing witnesses.

JOHN SCUDAMORE SELLON.

Witnesses:
WILLIAM JOHN WEEKS,
FRED GOATER,
    *Both of 31 Lombard street, London.*